(12) United States Patent
Mori et al.

(10) Patent No.: US 6,242,848 B1
(45) Date of Patent: Jun. 5, 2001

(54) OSCILLATION GYROSCOPE

(75) Inventors: Akira Mori; Yoshiaki Heinouchi; Yukio Sakashita, all of Nagaokakyo (JP)

(73) Assignee: Murata Manufacturing Co., Ltd. (JP)

( * ) Notice: Subject to any disclaimer, the term of this patent is extended or adjusted under 35 U.S.C. 154(b) by 745 days.

(21) Appl. No.: 08/565,989

(22) Filed: Dec. 1, 1995

(30) Foreign Application Priority Data

Dec. 2, 1994 (JP) .................................................. 6-329481

(51) Int. Cl.⁷ .................................................. H01L 41/08
(52) U.S. Cl. .......................... 310/326; 310/321; 310/348; 310/353
(58) Field of Search .................................... 310/326, 348, 310/351–353, 321, 323, 316, 366; 73/505

(56) References Cited

U.S. PATENT DOCUMENTS

| | | | |
|---|---|---|---|
| 3,520,195 | 7/1970 | Tehon | 310/316 |
| 3,678,309 | * 7/1972 | Choffat | 310/353 |
| 3,805,509 | * 4/1974 | Assmus | 310/326 X |
| 4,431,935 | 2/1984 | Rider | 310/331 |
| 4,540,908 | * 9/1985 | Mooney et al. | 310/326 |
| 4,799,385 | 1/1989 | Hulsing et al. | 73/505 |
| 5,012,174 | 4/1991 | Adkins et al. | 318/649 |
| 5,117,148 | 5/1992 | Nakamura et al. | 310/367 |
| 5,256,929 | * 10/1993 | Terajima | 310/326 |
| 5,270,607 | 12/1993 | Terajima | 310/316 |
| 5,345,822 | * 9/1994 | Nakamura et al. | 73/505 |
| 5,349,857 | 9/1994 | Kasanami et al. | 73/505 |
| 5,355,034 | 10/1994 | Nakamura et al. | 307/491 |
| 5,400,269 | 3/1995 | White et al. | 364/570 |
| 5,412,204 | 5/1995 | Nakamura et al. | 250/231.12 |
| 5,415,039 | 5/1995 | Nakamura et al. | 73/517 AV |
| 5,430,342 | 7/1995 | Watson | 310/316 |
| 5,434,467 | 7/1995 | Abe et al. | 310/366 |
| 5,497,044 | * 3/1996 | Nakamura et al. | 310/348 |

FOREIGN PATENT DOCUMENTS

| | | |
|---|---|---|
| 0520467A3 | 6/1992 | (EP) . |
| 0520468A2 | 6/1992 | (EP) . |
| 0520467 | 12/1992 | (EP) . |
| 0579974 | 6/1993 | (EP) . |
| 0597338 | 10/1993 | (EP) . |
| 6416911 | 1/1989 | (JP) . |
| 618266 | 1/1994 | (JP) . |
| 650761 | 2/1994 | (JP) . |
| 6147899 | 5/1994 | (JP) . |

* cited by examiner

*Primary Examiner*—Mark O. Budd
(74) *Attorney, Agent, or Firm*—Ostrolenk, Faber, Gerb & Soffen, LLP (57) ABSTRACT

A protection plate 36a and a protection plate 36b, which are each of a substantially rectangular shape and which extend upwards from respective substantially central portions of opposite lengthwise ends of an attachment platform 34, are formed in the attachment platform 34 by bending part of the attachment platform 34. Also, stoppers 46a and 46b, which have notches 48 for protecting two surfaces on either side of the ridge line of the oscillator 12, are attached to the attachment platform 34. Further the oscillator 12, the attachment platform 34, and the stoppers 46a and 46b etc. are housed in a box-shaped case 50. Accordingly, the vicinities of both lengthwise ends of the oscillator 12 are surrounded and protected by the stoppers 46a and 46b. The protection plates 36a and 36b, and the inner side surface of the case 50 as the protection members in the predetermined space d. By means of this structure, an oscillation gyroscope is provided in which the shock resistance is further improved.

20 Claims, 8 Drawing Sheets

OSCILLATION GYROSCOPE

BACKGROUND OF THE INVENTION

Figure 9:
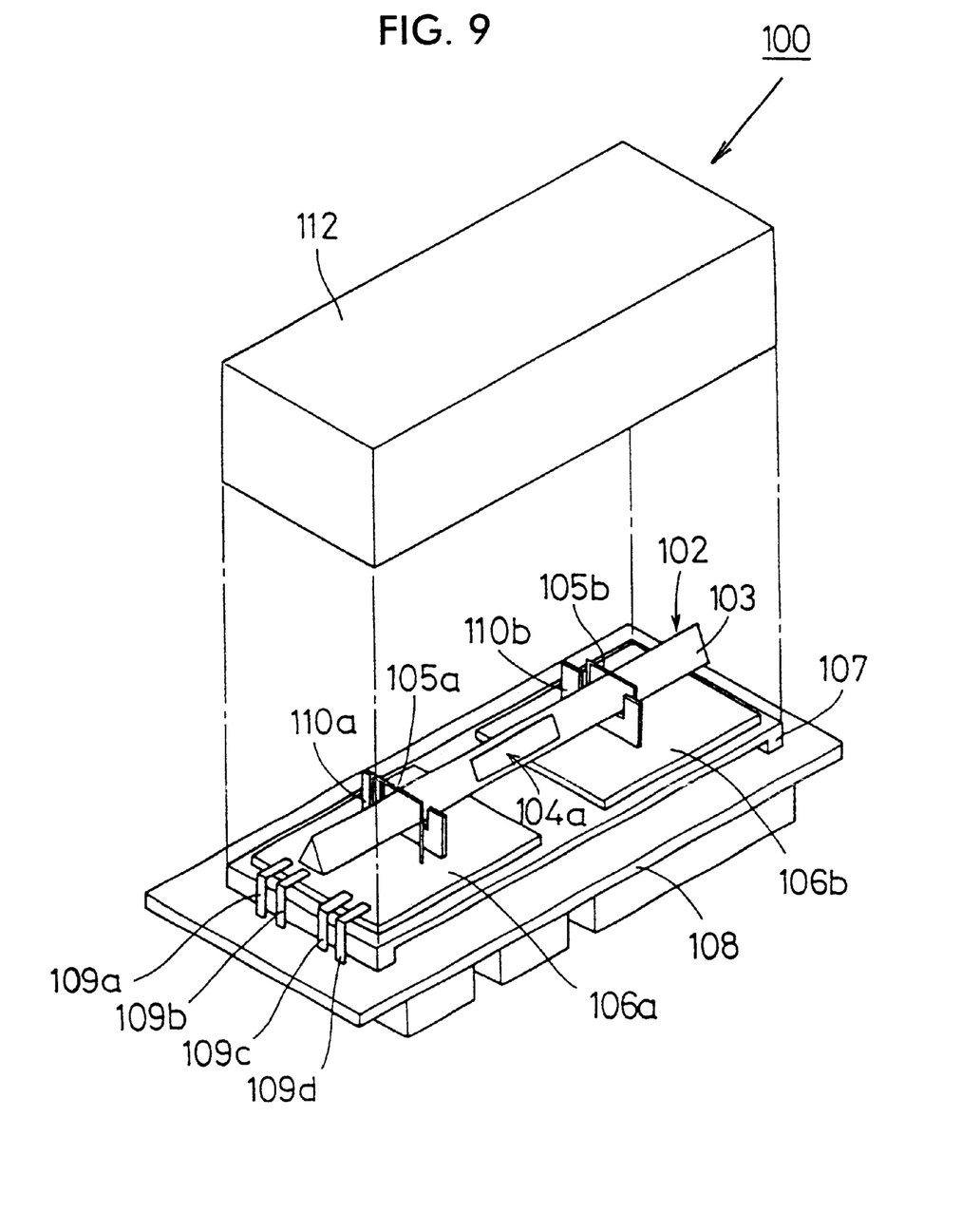
FIG. 9 is a cutaway view showing an example of a prior art oscillation gyroscope which is the background of this invention.
Figure 10:
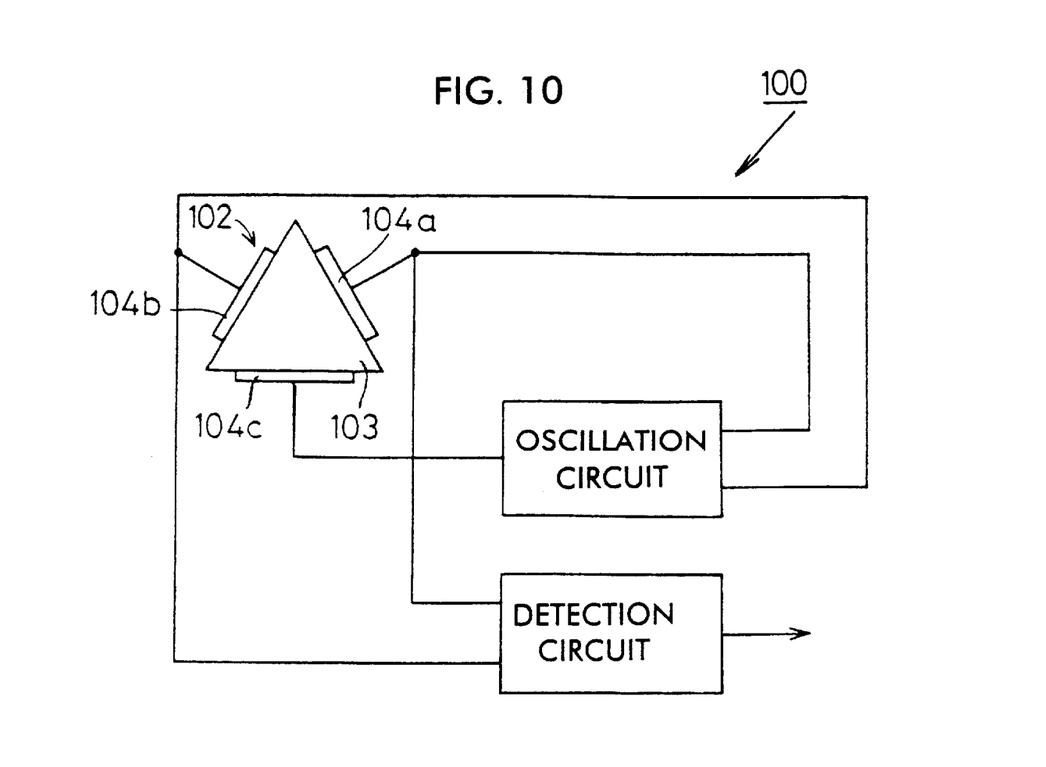
FIG. 10 is a circuit drawing of the prior art oscillation gyroscope.

The present invention relates to an oscillation gyroscope, and in particular to an oscillation gyroscope which is used in navigation systems, shaking prevention systems and the like, for example. FIG. 9 is a cutaway perspective view showing an example of a conventional oscillation gyroscope 100 which is the background of this invention, and FIG. 10 is a circuit drawing of the oscillation gyroscope 100. This oscillation gyroscope 100 includes an oscillator 102. The oscillator 102 includes a cross-sectional triangular oscillating body 103, and piezoelectric elements 104a, 104b and 104c which are formed in the three side surfaces of the oscillating body 103, as shown in FIG. 10. Each of these piezoelectric elements 104a to 104c form electrodes on both surfaces of a piezo ceramics for example.

As shown in FIG. 9, the oscillator 102 has support members 105a and 105b which are substantially C-shaped and are each attached to ridge line portions in the vicinity of two node points. The end portions of these support members 105a and 105b are respectively fixed to a flat plate shaped attachment boards 106a and 106b. The attachment boards 106a and 106b are separated into two so as not to suppress the vibration of the oscillator 102. Also, a plurality of terminal electrodes (not shown in the drawing) are formed on the attachment board 106a, and these are respectively electrically connected with the electrodes of the piezoelectric elements 104a to 104c of the oscillator 102 via lead wires. Further, on the attachment boards 106a and 106b, substantially C-shaped protective plates 110a and 110b are fixed substantially perpendicular to the main surfaces of the attachment boards 106a and 106b by attaching them by soldering or welding. The protective plates 110a and 110b have respective predetermined gaps from the lower surface of the oscillator 102, which are for the purpose of protecting the support members 105a and 105b so that the oscillator 102 is not displaced more than necessary when shocks are imposed thereon.

The attachment boards 106a and 106b are each fixed to one main surface of a cross-sectional substantially C-shaped metal frame 107. The metal frame 107 is fixed to one main surface of a flat plate-shaped circuit board 108. An oscillator circuit 113 comprising chip components such as an operational amplifier, resistors, capacitors, etc., a variable resistor unit etc., and a detection circuit 114, and the like are mounted on the other main surface of the circuit board 108. Also, the attachment board 106a and the circuit board 108 are rigidly coupled to each other by rigid metal terminals 109a to 109d comprising metal plates which are substantially L-shaped and have predetermined widths and lengths. The end portions of each of the rigid metal terminals 109a to 109d are each rigidly fixed to the attachment board 106a and the circuit board 108, respectively. Also, the terminal electrodes on the attachment boards 106a and 106b are connected to the terminal electrodes (not shown in the drawing) of the circuit board 108 via the rigid metal terminals 109a to 109d, respectively. Further, as shown in FIG. 9, the oscillator 102, the metal frame 107, the rigid metal terminals 109a to 109d, etc. are all housed in a box-shaped case 112. In addition, both ends in the length direction of the oscillator 102 are protected by the inside surface of the case 112 so that the oscillator 102 is not displaced more than necessary when shocks are imposed thereon.

As shown in FIG. 10, one piezoelectric element 104c of the oscillator 102 is electrically connected to an input terminal of the oscillator circuit 113, and an output terminal of the oscillator circuit 113 is electrically connected to the other two piezoelectric elements 104a and 104b, respectively. As a result, the oscillator 102 is driven by self-excitation. Also, the two piezoelectric elements 104a and 104b are each electrically connected to input terminals of the detection circuit 114 comprising a differential amplifier, for example. Accordingly, rotation angle velocity is detected by the output circuit of the detection circuit 114.

However, if the spaces between the oscillator 102 and the case 112 surrounding it and the protective plates 110a and 110b is too short, the vibration of the oscillator 102 is hindered, and if the spaces are too long, the oscillator 102 is greatly displaced when a shock is imposed causing the support members 105a and 105b to be plastically deformed. As a result, there is a possibility that the oscillation gyroscope 100 may cease to function. Therefore, these spaces must be precisely formed to a length which does not hinder the vibration of the oscillator 102 and which does not cause plastic deformation of the support members 105a and 105b.

However, because in the oscillation gyroscope 100 of the prior art, the protective plates 110a and 110b are affixed by soldering or the like, the space between the protective plates 110a and 110b and the oscillator 102 may fluctuate readily depending on the amount of solder or the like. Further, the space between the protective plates 110a and 110b and the oscillator 102 may fluctuate readily in the period until the solder or the like hardens.

In addition, because the metal terminals 109a to 109d are provided at only one location in the lengthwise direction of the oscillator 102, when the case 112 is attached, the space between the case 112 and the oscillator 102 may vary readily at both sides in the lengthwise direction of the oscillator 102. Further, in the prior art oscillator gyroscope 100, the upper end in the height direction of the oscillator 102 is protected by the case 112, but it is difficult to form the space between the case 112 and the oscillator 102 precisely.

In this way, in the oscillation gyroscope 100 of the prior art, because it is difficult to precisely form the space between the oscillator 102 and the periphery thereof, it is also difficult to improve the shock resistance thereof. Also, in the oscillation gyroscope 100 shown in FIG. 9, displacement in both diagonal upward directions of the oscillator 102 cannot be sufficiently prevented, and when a large shock is imposed in these directions, the shock resistance has not been found to be sufficient.

SUMMARY OF THE INVENTION

Given the above, the main object of this invention is to provide an oscillation gyroscope having excellent shock resistance.

The oscillation gyroscope of this invention is an oscillation gyroscope comprising an oscillator, support members for supporting the oscillator close to a node point thereof, and protective members disposed surrounding a periphery of the oscillator, for preventing displacement of the oscillator so that the support members do not cause plastic deformation. Further, it further comprises attachment boards for supporting the oscillator and the support members, and the protective members preferably include members formed by bending part of the attachment bases in the direction of the oscillator. Also, the protective members preferably include members having notches corresponding to a shape of the oscillator.

Since the periphery of the oscillator is surrounded and protected by the protective members, even when a large shock is imposed on the oscillation gyroscope, the oscillator is not displaced more than a predetermined limited amount and plastic deformation of the support members is prevented. Also, where members formed by bending part of the attachment board in the direction of the oscillator are included in the protective members, the precision of the gap between these members and the oscillator can be improved. Further, where members having a notch corresponding to the shape of the oscillator are included in the protective members, the gap between these members and the oscillator can be precisely formed.

According to this invention, since the protective members are provided surrounding the periphery of the oscillator, the support members of the oscillator do not easily cause plastic deformation even when a shock is imposed on the oscillator from any direction, and an oscillation gyroscope having excellent shock resistance can be obtained. Further, the protective members enable the gap with the oscillator to be precisely formed, thereby reliably protecting the oscillator and the support members. Further still, according to this invention, since the shock resistance thereof is improved, it is possible to make the wiring diameter of the supporting members of the oscillator thinner than the prior art. In such a case, because damping of the vibration of the oscillator by the support members is reduced, and the vibration configuration of the oscillator is stabilized, the detection precision of angle rotation velocities can be improved.

The above-described object of this invention and other objects, features and advantages will become clearer from the following detailed description of embodiments thereof, with reference to the drawings.

DETAILED DESCRIPTION OF THE INVENTION

Referring now to the drawings and, in particular, to FIGS. 1–5, the oscillation gyroscope 10 of this embodiment of the invention includes an oscillator 12. The oscillator 12 includes an elongated, equilateral prism-shaped oscillating body 14; however, the oscillating body 14 is not limited to this shape and the oscillating body 14 may have any other suitable shape, such as, for example, cylindrical or rectangular. The oscillating body 14 of this embodiment is formed in an equilateral triangular prism shape by a process of drawing a continuously malleable metal material, such as, for example, nickel, iron, chrome, titanium, or an alloy thereof, for example elinvar or an iron-nickel alloy, etc. Note that the oscillating body 14 can also be formed with a material other than a metal which generally produces a mechanical vibration, such as quartz, glass, crystal, ceramics or the like.

Figure 5:
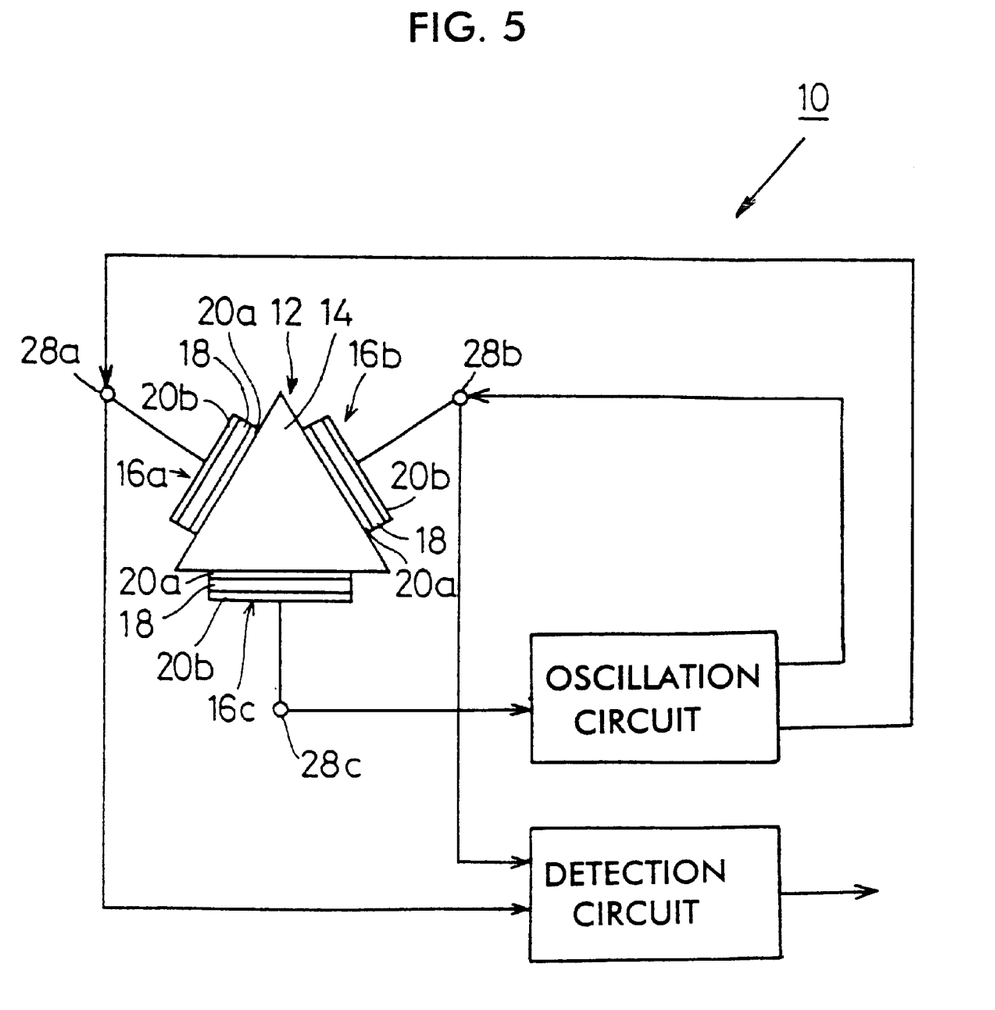
FIG. 5 is a circuit drawing of the embodiment shown in FIG. 1.

On the central portions of the three side faces of the oscillating body 14, as best shown in FIG. 5, are affixed piezoelectric elements 16a, 16b and 16c. These piezoelectric elements 16a, 16b and 16c each include a piezoelectric layer 18 formed from a ceramic, for example. In both main surfaces of these piezoelectric layers 18 are respectively formed electrodes 20a and 20b. Also, the electrode 20a of one main surface of each of the piezoelectric elements 16a, 16b and 16c is adhered to the side face of the oscillating body 14 by a conductive adhesive, for example. Note that in this embodiment, two of the piezoelectric elements 16a and 16b are used as drivers to impose a curve vibration on the oscillating body 14 in a direction perpendicular to a formation surface of the piezoelectric element 16c and as detectors for detecting the displacement of the oscillating body 14, and the other piezoelectric elements 16c is used to feed back the drive signal to the two piezoelectric elements 16a and 16b.

The oscillator 12 is supported by two support members 22a and 22b. The support members 22a and 22b are each formed substantially C-shaped by wire made of metal, for example. Also, the central portions of the support members 22a and 22b are each fixed to one ridge line portion of the oscillating body 14 which is surrounded by the two piezoelectric elements 16a and 16b. In this case, the support members 22a and 22b are preferably affixed in the vicinity of the node point of the oscillating body 14 in order to make the vibration of the oscillating body 14 difficult to suppress. In this embodiment, the support members 22a and 22b, where the length of the oscillating body 14 is taken as L, are fixed to positions 0.224L from both ends of the oscillating body 14.

The support members 22a and 22b are affixed to the oscillating body 14 by being adhered using an adhesive for example, by being soldered or welded. Where they are affixed by soldering or welding, it is preferable for the support members 22a and 22b to be formed of a wiring material plated with a material which has favorable solderability and weldability such as nickel, white gold, gold, silver, copper, stainless steel, iron and the like, for example. The wiring material is formed of a strong metal wire such as molybdenum, titanium or the like for example, to provide strength to the support members 22a and 22b.

Figure 1:
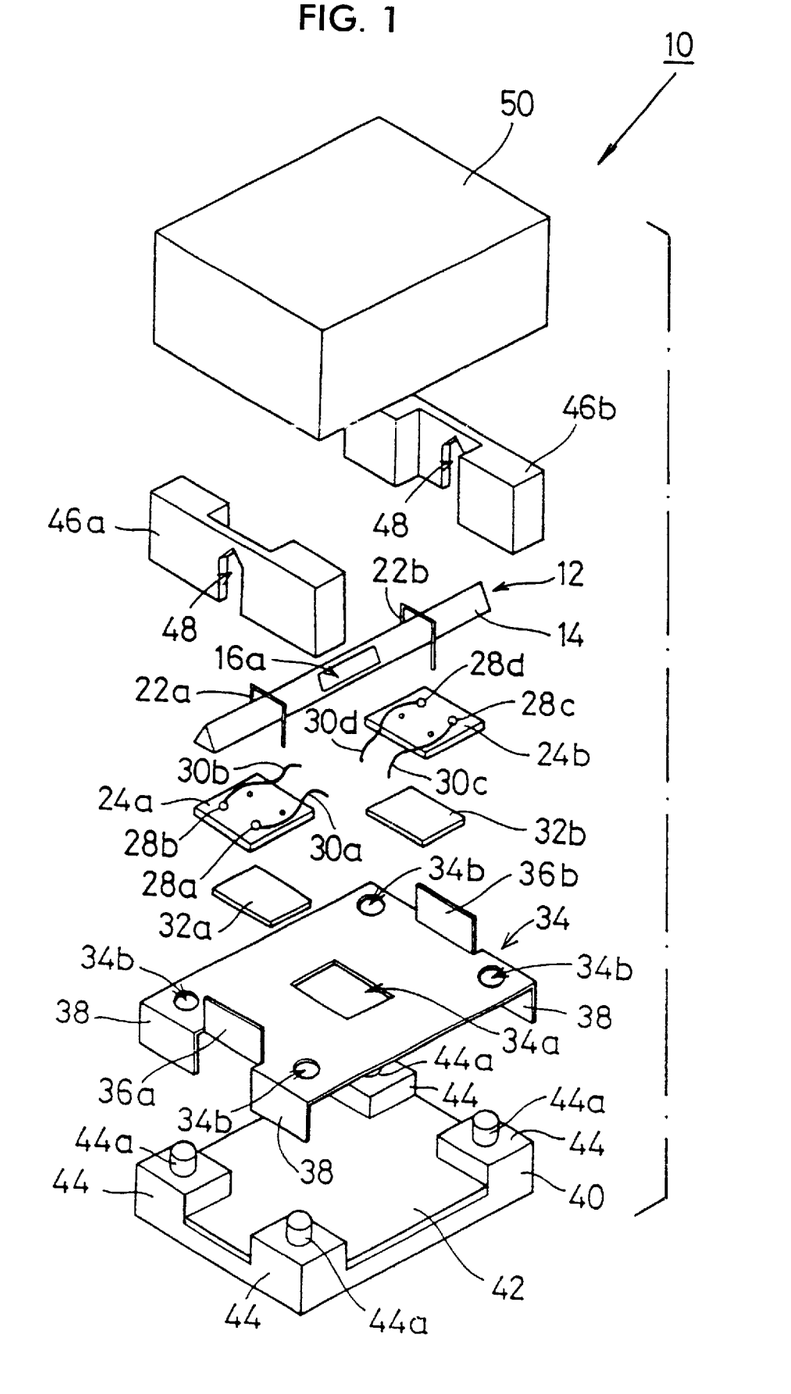
FIG. 1 is an exploded perspective view showing one embodiment of this invention.
Figure 2:
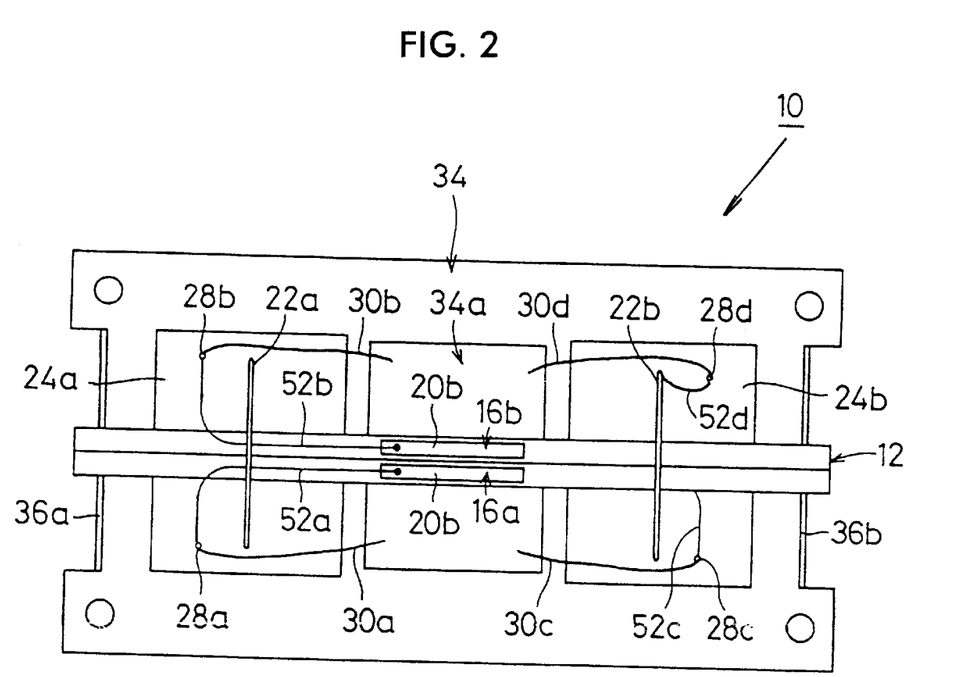
FIG. 2 is a plan view showing the main components of the embodiment shown in FIG. 1.
Figure 3:
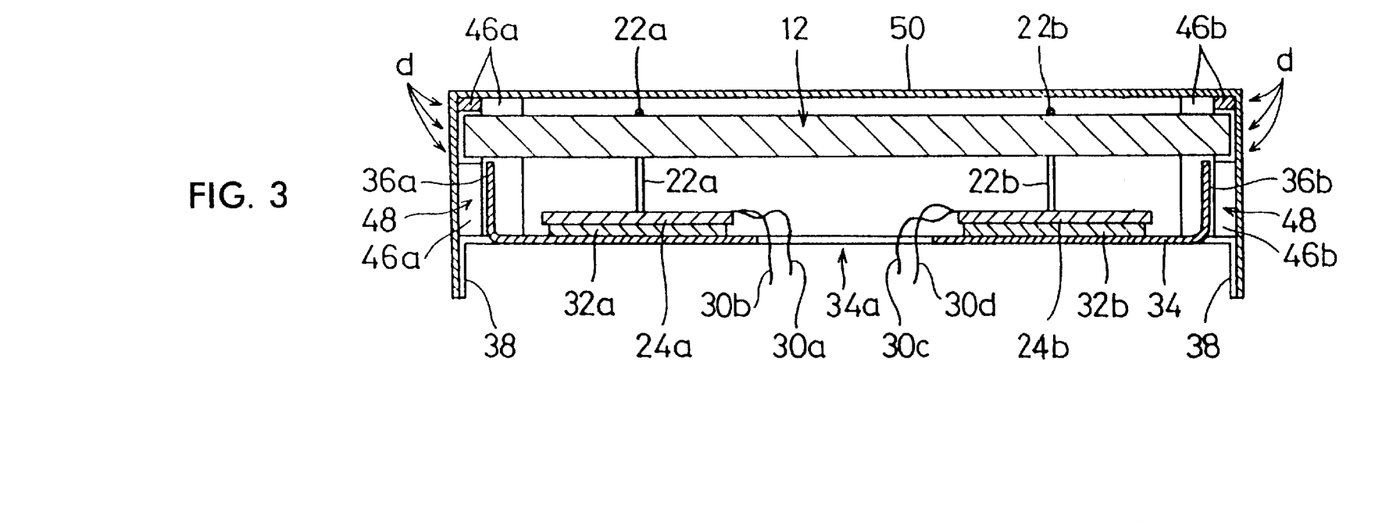
FIG. 3 is a cross-sectional drawing showing the main components of the embodiment shown in FIG. 1.

Both end portions of these support members 22a and 22b, as shown in FIG. 1 through FIG. 3 are each firmly fixed to attachment boards 24a and 24b made in a substantially rectangular shape, for example, from a metal material such as iron, nickel, stainless steel, etc. or glass fiber reinforced epoxy resin etc. for example. In this case, two holes are each formed in the attachment boards 24a and 24b, and both end portions of the support members 22a and 22b may be fixed by perforating the holes of the attachment boards 24a and 24b and fixing the support members 22a and 22b in the holes by soldering or any other suitable technique.

Also, as best shown in FIG. 2, a terminal electrode 28a and a terminal electrode 28b are formed on one main surface of the attachment board 24a, and a terminal electrode 28c and a terminal electrode 28d are formed on the attachment board 24b. The terminal electrode 28a is connected to the electrode 20b of the piezoelectric element 16a by a lead wire 52a. Also, the terminal electrode 20b is connected to the electrode 20b of the piezoelectric element 16b by a lead wire 52b. Further the terminal electrode 28c is connected to the electrode 20b of the piezoelectric element 16c by a lead wire 52c. Also, the terminal electrode 28d is electrically connected to the support member 22b, for example, by a lead wire 52d and is used as an earth terminal electrode.

Further, lead wires 30a, 30b, 30c and 30d are connected to each of the terminal electrodes 28a, 28b, 28c and 28d by soldering, for example. As the lead wires 30a of this embodiment, conductive wires having flexibility and which include copper or the like for example are used. These lead wires 30a to 30d are each connected by soldering or the like to the terminal electrode(s) (not shown in the drawing) of a circuit base 42 (FIG. 1) described later through a through hole 34a of an attachment platform 34 described later. Note that the terminal electrodes 28a to 28d of the attachment boards 24a and 24b may be formed on a conductor pattern on the attachment boards 24a and 24b, for example, and may be connected to the lead wires 30a to 30d via this conductor pattern. They may also be extracted to the other main surface of each of the attachment board 24a and the attachment board 24b via through holes, for example, and connected to the lead wires 30a to 30d.

Also, the attachment boards 24a and 24b, as shown in FIG. 1 and FIG. 3, are fixed on one main surface of a substantially flat plate shaped attachment platform 34 via neutral members 32a and 32b. The neutral members 32a and 32b are for absorption so that vibration does not leak from the attachment boards 24a and 24b to the attachment platform 34 and external shocks are not transmitted from the attachment platform 34 to the attachment boards 24a and 24b, and are formed using a silicon sponge or another resin sponge, for example.

The attachment platform 34 comprises a material having magnetism and conductivity such as iron, nickel, stainless steel, etc., for example. A protection plate 36a and a protection plate 36b, which are of a substantially rectangular shape and which extend upwards from respective substantially central portions of opposite lengthwise ends of the attachment base 34 are integrally formed in the attachment platform 34 by bending part of the attachment platform 34. These protection plates 36a and 36b are protective members for protecting the support members 22a and 22b such that the oscillator 12 is not displaced more than necessary downward in the direction of the height thereof, i.e. the support members 22a and 22b are not displaced downward more than necessary in the direction of the height of the oscillator 12. Also, foot portions 38 are integrally formed at each corner of the attachment base 34, each foot portion extending downward from a respective corner of the attachment platform 34 and in the direction of the width of the protection plates 36a and 36b. In addition, a rectangular shaped through hole 34a is formed in the substantially central portion of the attachment platform 34. Further, circular through holes 34b are formed in the vicinity of each of the four corners of the attachment platform 34.

The attachment platform 34 is attached to a base member 40 made of resin or metal, so that the foot portions 38 thereof each cover at both end surfaces in the lengthwise direction of the base member 40. A circuit board 42 formed from glass fiber-reinforced epoxy resin or the like, for example, is attached to substantially the central portion of the base member 40. An oscillator circuit 70, detection circuit 71, etc. for example are mounted on this circuit board 42. The oscillator circuit 70, detection circuit 71, etc. are connected to terminal electrodes (not shown in the drawing) formed on the circuit board 42. Also lead wires 30a to 30d are each connected to the terminal electrodes (not shown in the drawing) on the circuit board 42. Accordingly, the circuit board 42 and attachment boards 24a and 24b of this embodiment are connected by flexible lead wires 30a to 30d.

The oscillator circuit 70, which may be the same as the prior art oscillator circuit 113 of FIG. 10, is for driving and vibrating the oscillator 12 and includes a quartz crystal for stabilizing the oscillation frequency and a phase correction circuit for adjusting the oscillation frequency. The input terminal of this oscillator circuit, as shown in FIG. 5, is electrically connected to a terminal electrode 28c and an electrode 20b of the piezoelectric element 16c of the oscillator 12 via a lead wire or the like, while the output terminal of the oscillator circuit 70 is electrically connected to each of the terminal electrodes 28a and 28b and electrodes 20b of the piezoelectric elements 16a and 16b via lead wires or the like.

The detection circuit 71, which may be the same as the prior art detection circuit 114 of FIG. 10, is for detecting displacement of the oscillator 12, and comprises a differential amplifier, for example. The two input terminals of this detection circuit 71 are each electrically connected to the electrode 20b of the piezoelectric elements 16a and 16b via the terminal electrodes 28a and 28b and lead wires or the like.

Also, rectangular protruding members 44 are each provided protruding upward at the four corners of the base member 40, and guide pins 44a are provided protruding upward at each of the substantially central portions of the protruding members 44. The guide pins 44a each interfit with through holes 34b of the attachment platform 34. Thus, the attachment platform 34 is fixed to the base member 40 in a floating state from the circuit board 42.

Also, two stoppers 46a and 46b are attached to the attachment platform 34 as protective members for protecting the oscillator 12 so as to cover from above the vicinities of both lengthwise ends of the oscillator 12. As shown in FIG. 1, the stoppers 46a and 46b are each formed substantially C-shaped as seen from the horizontal plane. These stoppers 46a and 46b are formed by a material having magnetism and conductivity, such as iron, nickel, stainless steel, etc. or an insulative material, such as resin, etc.

Figure 4:
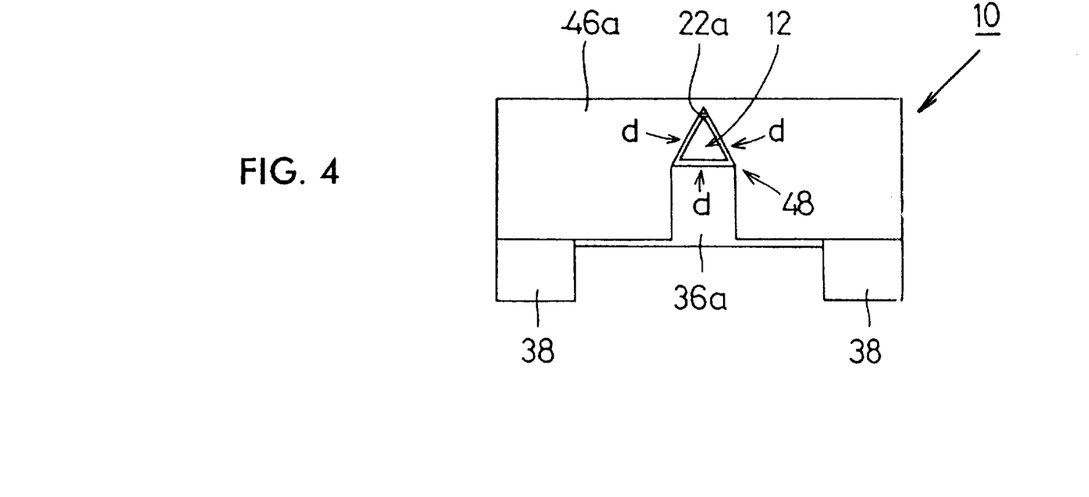
FIG. 4 is a front view showing the main components of the embodiment shown in FIG. 1.

Notches 48 are formed extending in the height direction in the stoppers 46a and 46b. As shown in FIG. 4, the upper sides of the notches 48 in the height direction are formed in equilateral triangle shapes corresponding to the shape of the cross-sectional equilateral shaped oscillator 12 to protect the two surfaces on either side of the ridge line of the oscillator 12. The stopper 46a and stopper 46b are for protecting the support members 22a and 22b so that the oscillator 12 is not displaced more than necessary in height, diagonal and width directions thereof, i.e. the support members 22a and 22b are not displaced more than necessary in height, diagonal and width directions of the oscillator 12. Accordingly, the vicinities of both lengthwise ends of the oscillator 12 are surrounded and protected in an equilateral triangle shape by the stoppers 46a and 46b and the protection plates 36a and 36b with a predetermined gap d around the periphery thereof.

As shown in FIG. 1 and FIG. 3, the oscillator 12, the attachment platform 34, stoppers 46a and 46b, etc. are housed in a box-shaped case 50. This case 40 is formed from a material having high magnetic permeability without coercive force in terms of a magnetic shielding effect, for example, a material such as permalloy, 42Ni, etc. The case 50 is fixed to the outer side surfaces of the foot members 38 of the attachment platform 34. The case 50 of this embodiment functions as a protective member for the oscillator 12. In other words, both lengthwise direction ends of the oscillator 12 are protected by the inner side surface of the case 50. Note that in this embodiment the gap d between the two surfaces on either side of the ridge line of the oscillator 12 and the notches 48 of the stoppers 46a and 46b shown in FIG. 4, the gap d between the lower surface of the oscillator 12 and the front ends of the protection plates 36a and 36b, and the gap d between the oscillator 12 and the inner side surface of the case 50 shown in FIG. 3 are each formed to be 0.5 mm for example.

In the oscillation gyroscope 10 of this embodiment, the electrodes 20b of the piezoelectric elements 16a to 16c of the oscillator 12, and the support member 22b and terminal electrodes 28a to 28d of the attachment boards 24a and 24b are each connected by lead wires 52a to 52d, and the terminal electrodes 28a to 28d of the attachment boards 24a and 24b and the terminal electrodes (not shown in the drawing) of the circuit board 42 are connected by lead wires 30a to 30d. Because the lead wires are flexible, it is difficult for vibrations leaking out from the oscillator 12 to the attachment boards 24a and 24b to leak from the attachment boards 24a and 24b to the circuit board 42. Further, the attachment boards 24a and 24b are attached to the attachment platform 34 via the neutral members 32a and 32b. Therefore, the vibration of the oscillator 12 is stabilized and detection precision of the rotation angle velocity is improved. Also, because the attachment boards 24a and 24b and the circuit board 42 are connected by the lead wires 30a to 30d in a vibration-free state, the vibration leakage amount of the oscillator 12 does not depend on changes in the surrounding temperature, the temperature characteristic of the oscillation gyroscope 10 is stabilized, and the detection precision of rotation angle velocity is improved.

Also, in this embodiment, the vicinity of both lengthwise ends of the oscillator 12 are surrounded and protected in an equilateral triangle shape with a predetermined space d therearound by the stoppers 46a and 46b and the protection plates 36a and 36b, and both lengthwise ends are protected by the inner side surface of the case 50 with a predetermined space d therebetween. Accordingly, the shock resistance of this oscillation gyroscope 10 is improved in all directions surrounding the oscillator 12. Further because the notches 48 of the stoppers 46a and 46b are formed corresponding to the shape of the oscillator 12, the space d between the two surfaces on either side of the ridge line of the oscillator 12 and the stoppers 46a and 46b can be precisely formed. Also, since part of the attachment platform 34 is bent upward to form protection plates 36a and 36b, the space d between the lower surface of the oscillator 12 and the front ends of the protection plates 36a and 36b can be precisely formed. Further, because the lead wires 30a to 30d are connected from the attachment boards 24a and 24b to the circuit board 42 through the through hole 34a of the attachment platform 34, the space d between the oscillator 12 and the inner side surface of the case 50 is easily made symmetrical at the opposite lengthwise sides of the oscillator 12 and the precision thereof is improved. In this way, by improving the precision of the spaces d between the oscillator 12 and the protection plates 36a and 36b, and with the stoppers 46a and 46b and the case 50 as protective members surrounding the oscillator 12, the oscillator 12 is reliably protected when a large shock is imposed on the oscillation gyroscope 10 and the displacement of the oscillator 12 by more than a predetermined limit is prevented; thus, plastic deformation of the support members 22a and 22b can be prevented. As a result, the shock resistance of the oscillation gyroscope 10 of this embodiment is improved.

Also, because this oscillation gyroscope 10 has improved shock resistance, the support members 22a and 22b can be made thinner than the prior art, for example, if they were $\phi$0.25 mm in the prior art, it is possible to make them $\phi$0.20 mm. By thinning the support member 22a and 22b in this way, the vibration configuration of the oscillator 12 can be stabilized and the detection precision of rotation angle velocities can be improved.

Figure 6:
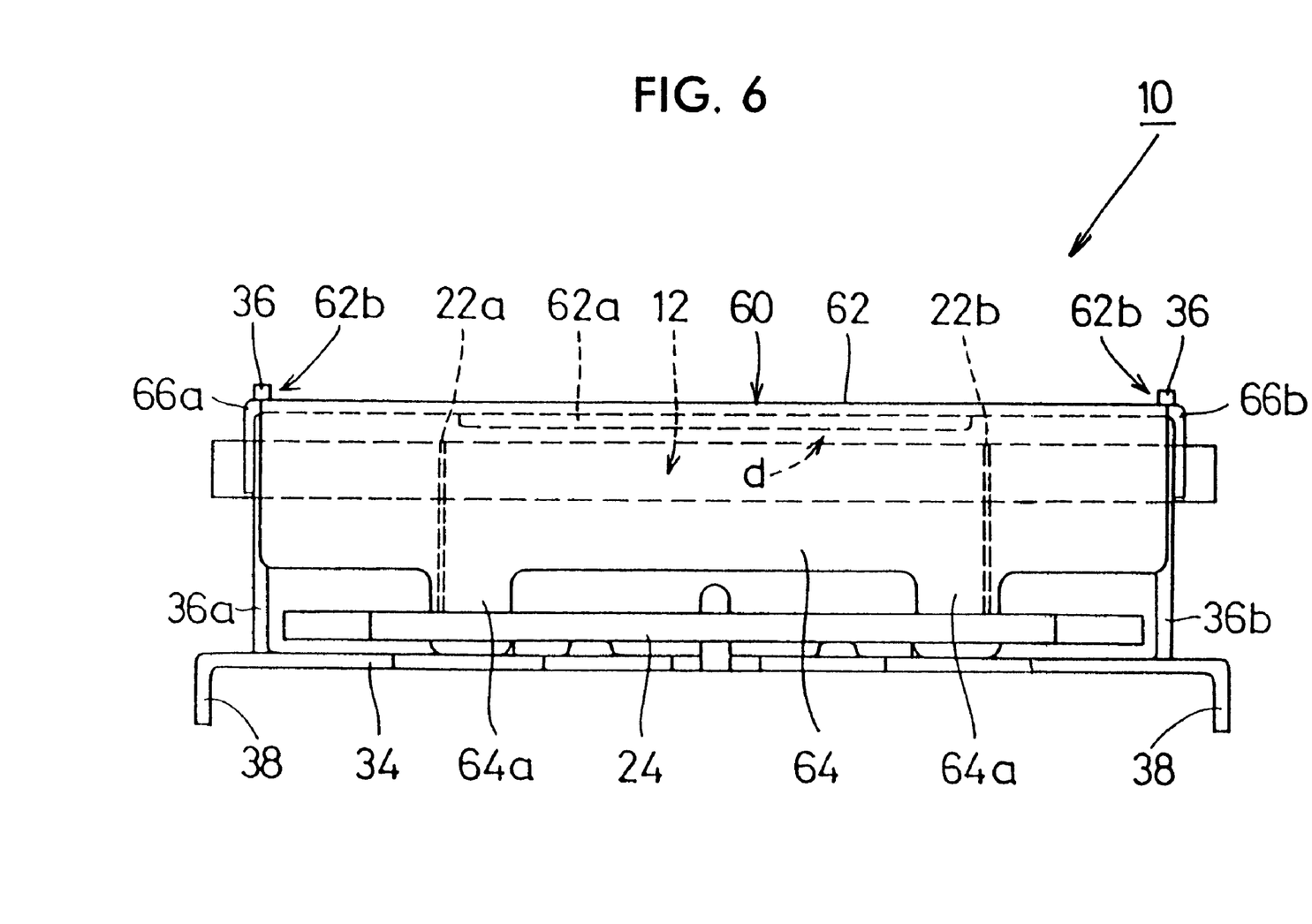
FIG. 6 is a side view showing the main components of another embodiment of this invention.
Figure 7:
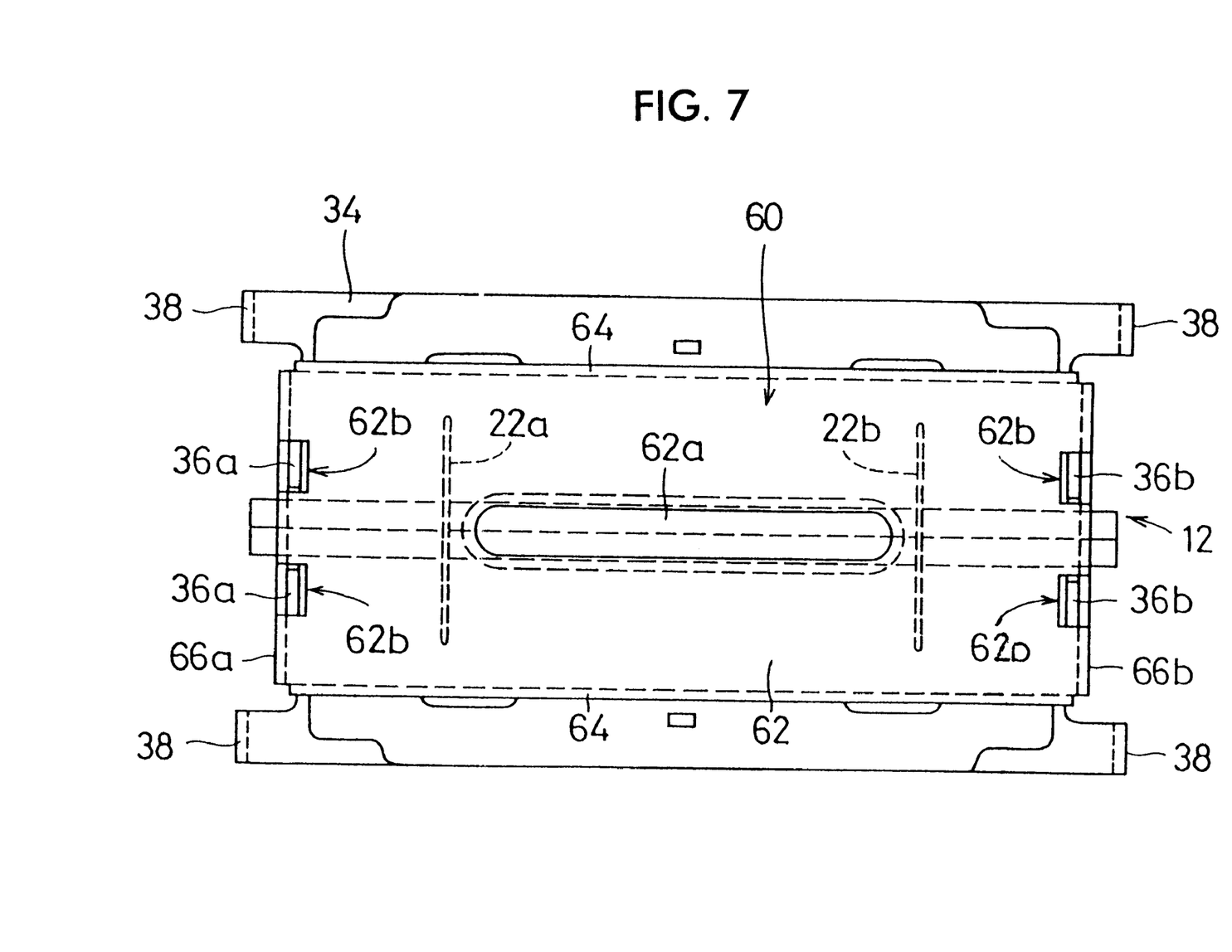
FIG. 7 is a plan view showing the main components of the embodiment shown in FIG. 6.
Figure 8:
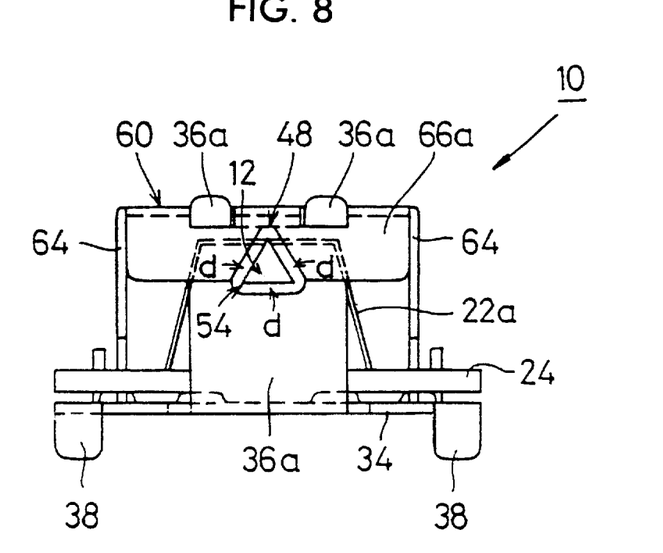
FIG. 8 is a front view showing the main components of the embodiment shown in FIG. 6.

Referring now to FIGS. 6–8, another embodiment of the invention will be described. Components which are the same as those in the first embodiment of FIGS. 1–5 are described by the same reference numeral; components which are different but perform similar functions are designated by primed reference numerals. The attachment platform 34' of the oscillation gyroscope 10' of this embodiment includes a substantially U-shaped protection plate 36'a and a substantially U-shaped protection plate 36'b each extending upward from respective substantially central portions of opposite lengthwise direction ends of the attachment platform 34' and having protrusions in the upper portions thereof. The substantially U-shaped protection plates 36'a and 36'b have notches 54 formed in their substantially central portions thereof for protecting the periphery of the lower surface of the oscillator 12. These notches 54 are for protecting the oscillator 12 and the support members 22a and 22b so that the oscillator 12 is not displaced more than necessary in the height direction and width direction thereof and the support members 22a and 22b do not cause plastic deformation.

Also, the oscillation gyroscope 10' shown in FIG. 6 includes a work cover 60. This work cover 60 is attached to the attachment platform 34' so as to cover from above the oscillator 12 and the support members 22a and 22b, etc. The work cover 60 is formed from a material having magnetism, conductivity and malleability, such as iron, nickel, stainless steel or the like.

The work cover 60, as shown in FIG. 6 to FIG. 8 includes a short parallelepiped-shaped main surface member 62. In the substantially central portion of the main surface member 62 a substantially short parallelepiped-shaped protruding portion 62a is formed extending in the lengthwise direction and protruding in the direction of the oscillator 12. The protruding portion 62a is formed facing the ridge line of the substantially central portion of the oscillator 12 while maintaining a predetermined space d therewith. This protruding portion 62a is for covering the oscillator 12 and the support members 22a and 22b so that the oscillator 12 is not displaced more than necessary upward in the height direction thereof and the support members 22a and 22b do not incur plastic deformation. Also, in the vicinity of both lengthwise end portions of the main surface member 62, two substantially rectangular through holes 62b are formed for engaging with and fixing the protruding portions of the protection plates 36'a and 36'b of the attachment platform 34'.

Side surface members 64 are formed in the main surface member 62 extending downward from both sides in the wide direction thereof. The side surface members 64 are formed integrally with the main surface member 62, and are formed bent back at substantially right angles to both side portions of the main surface member 62 in the width direction. Two protrusion plates 64a are respectively formed protruding downward at the lower end portions of these side surface members 64. Also, by fixing the protrusion plates 64a of the side surface members 64 to the attachment platform 34', the work cover 60 is attached to the attachment platform 34'.

In addition, protection plates 66a and 66b are respectively formed in the main surface member 62 extending downward from both sides in the lengthwise direction thereof. The protection plates 66a and 66b are formed integrally with the main surface member 62, and are formed by bending back both end portions in the lengthwise direction of the main surface member 62 at substantially right angles. In this case, the protection plates 66a and 66b are bent back so as to overlap the protection plates 36'a and 36'b, as shown in FIG. 6 through FIG. 8. Also, equilateral triangular notches 48' are formed in respective substantially central portions of the protection plates 66a and 66b corresponding to the shape of the cross-sectional equilateral triangular oscillator 12. These protection plates 66a and 66b are for protecting the oscillator 12 and the support members 22a and 22b so that the oscillator 12 is not displaced more than necessary in the height, diagonal and width direction thereof and the support members 22a and 22b do not incur plastic deformation. The two protection plates 66a and 66b are disposed in the vicinity of both ends of the oscillator 12 in the lengthwise direction thereof and with predetermined space d between the two surfaces on either side of the ridge line of the oscillator 12 and the notches 48'. Consequently, as shown in FIG. 8, the vicinities of both ends in the lengthwise direction of the oscillator 12 are surrounded and protected in an equilateral triangular shape by the protection plates 66a and 66b and the protection plates 36'a and 36'b in the predetermined space d surrounding them.

This oscillation gyroscope 10 includes the same oscillator 12 as in the embodiment shown in FIG. 1. The oscillator 12 is supported by the same two support members 22a and 22b as in the embodiment shown in FIG. 1. Both end portions of these support members 22a and 22b are fixed by soldering to an attachment board 24 of e.g. substantially short parallelpiped-shape comprising a metallic material such as iron, nickel, stainless steel, etc for example or glass fiber-reinforced epoxy resin, for example, as shown in FIG. 6 through FIG. 8. Terminal electrodes are formed on this attachment board 24 similarly to the embodiment shown in FIG. 1, these terminal electrodes each being electrically connected to piezoelectric element terminals by lead wires. Further, the terminal electrodes are each electrically connected by lead wires to terminal electrodes (not shown in the drawing) of a circuit board disposed below the attachment platform 34', similarly to the embodiment shown in FIG. 1.

The same effects as in the embodiment shown in FIG. 1 can also be achieved in the embodiment shown in FIGS. 6 through 8. Further, according to this embodiment, since the space above the ridge line in substantially the central portion of the oscillator 12 is protected by the protruding portion 62a, the shock resistance of the oscillation gyroscope 10 is further improved.

Note that in the above embodiment, although the space d between the oscillator 12 and each of the protective members surrounding it is formed with a constant length of 0.5 mm for example, it is not limited to this and need only be a length which does not hinder the vibration of the oscillator 12 and does not cause plastic deformation of the support members 22a and 22b. Also, the spaces d between the oscillator 12 and its surrounding protective members may also be each formed with a different length.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An oscillation gyroscope comprising:
    an oscillator having at least two node points;
    at least two support members for supporting the oscillator close to the node points thereof, respectively; and
    protective members disposed surrounding a periphery of the oscillator for preventing displacement of the oscillator so that the support members are not plastically deformed.

2. An oscillation gyroscope according to claim 1, further comprising an attachment base for supporting the oscillator and the support members, and wherein the protective members include protective elements formed by bending part of the attachment base in the direction of the oscillator.

3. An oscillation gyroscope according to claim 2, wherein the protective elements have notches corresponding to the shape of the oscillator.

4. An oscillation gyroscope according to claim 1, wherein the protective members include protective elements having notches corresponding to the shape of the oscillator.

5. An oscillation gyroscope according to claim 4, wherein the support members are attached to first and second spaced attachment boards, respectively.

6. An oscillation gyroscope according to claim 5, wherein the first and second attachment boards are connected to an attachment base.

7. An oscillation gyroscope according to claim 6, further including means intermediate the first and second attachment boards and the attachment base for suppressing any vibration therebetween.

8. An oscillation gyroscope according to claim 7, wherein the suppression means comprises a first sponge-like member connected intermediate the first attachment board and the attachment base, and a second sponge-like member connected intermediate the second attachment board and the attachment base.

9. An oscillation gyroscope according to claim 1, wherein the oscillator includes an elongated oscillating body having a top, a bottom and sidewalls which define a triangular cross section, the oscillating body further having longitudinally opposed end walls.

10. An oscillation gyroscope according to claim 9, wherein the support members include C-shaped wires, each defining a crosspiece and depending legs attached to the attachment base, the top of the oscillating body being attached to each crosspiece.

11. An oscillation gyroscope according to claim 9, wherein the protective members include a stopper member having a triangular notch conforming to the triangular cross sectional shape of the oscillating body, the oscillating body being received within the triangular notch so that the side walls of the oscillating body are spaced from the side walls of the triangular notch.

12. An oscillation gyroscope according to claim 11, further including a cover for enclosing the oscillating member, the cover having side walls spaced from the end walls of the oscillating member.

13. An oscillation gyroscope according to claim 12, wherein the spacing between the side walls of the oscillating body and the sidewalls of the notch, the spacing between the bottom of the oscillating body and the upstanding member, and the spacing between the side walls of the cover and the end walls of the oscillating body are equal to one another.

14. An oscillation gyroscope according to claim 9, wherein the protective members include an attachment base having upstanding protective elements, each of which has a triangular shaped notch therein, the oscillating body being received within the notch so as to be spaced from the side and bottom walls of the notch.

15. An oscillating gyroscope according to claim 14, including a cover having side walls spaced from the end walls of the oscillating body and a top member spaced from the top of the oscillating body, the upstanding members of the attachment base having vertically protruding portions and the cover having openings for receiving the protruding portions of the upstanding members such that the protruding portions extend from the cover, wherein the spacing between the side walls and bottom of the oscillating body and the side and bottom walls of the notch are equal to one another and equal to the spacing between the side walls of the cover and the end walls of the oscillating body and the spacing between the top member of the cover and the top of the oscillating body.

16. An oscillation gyroscope circuit comprising:
    an oscillator having at least two node points;
    at least two support members for supporting the oscillator close to the node points thereof, respectively;
    protective members disposed surrounding the oscillator for preventing displacement of the oscillator so that the support members are not plastically deformed;
    attachment means having terminal electrodes electrically connected to the oscillator and to which the support members are fixed;
    a circuit board electrically connected to the terminal electrodes of the attachment means;
    means for connecting the terminal electrodes of the attachment base to the terminal electrodes of the circuit board;
    an oscillator circuit electrically connected to the circuit board; and
    a detection circuit electrically connected to the circuit board.

17. An oscillation gyroscope according to claim 16, wherein the protective members include protective elements having notches corresponding to the shape of the oscillator.

18. An oscillation gyroscope according to claim 16, wherein the attachment means includes an attachment base and the protective members include protective elements formed by bending part of the attachment base in the direction of the oscillator.

19. An oscillation gyroscope according to claim 18, further including a cover for enclosing the oscillating member, the cover having side walls spaced from the end walls of the oscillating member and the oscillator includes an elongated oscillating body having a top, a bottom and sidewalls which define a triangular cross section, the oscillating body further having longitudinally opposed end walls, and wherein the support members include C-shaped wires, each defining a crosspiece and depending legs attached to the attachment base, the top of the oscillating body being attached to each crosspiece, the protective elements including triangular notches conforming to the triangular cross sectional shape of the oscillating body, the oscillating body being received within the triangular notch so that the side walls of the oscillating body are spaced from the side walls of the triangular notch, and wherein the spacing between the side walls and bottom of the oscillating body and the sidewalls of and bottom of the notch, and the spacing between the side walls of the cover and the end walls of the oscillating body are equal to one another.

20. An oscillation gyroscope according to claim 19, further including an additional base having a top side and a bottom side, the attachment base and the circuit board being attached to the top side of the additional base such that the circuit board is spaced from the attachment base and the oscillator circuit and detection circuit being attached to the bottom side of the additional base.

* * * * *